US012456927B2

(12) United States Patent
Rehlaender et al.

(10) Patent No.: US 12,456,927 B2
(45) Date of Patent: Oct. 28, 2025

(54) ON-THE-FLY TOPOLOGY MORPHING FOR FREQUENCY-MULTIPLIER HALF-BRIDGE OPERATION

(71) Applicant: Delta Electronics (Thailand) Public Co., Ltd., Samutprakarn (TH)

(72) Inventors: Philipp Rehlaender, Paderborn (DE); Roland Unruh, Paderborn (DE); Frank Schafmeister, Warburg (DE); Joachim Böcker, Berlin (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 479 days.

(21) Appl. No.: 17/821,191

(22) Filed: Aug. 22, 2022

(65) Prior Publication Data
US 2023/0077388 A1  Mar. 16, 2023

(30) Foreign Application Priority Data
Aug. 20, 2021 (EP) .................................... 21192465

(51) Int. Cl.
*H02M 3/335* (2006.01)
*H02M 1/08* (2006.01)
*H02M 3/00* (2006.01)

(52) U.S. Cl.
CPC ......... *H02M 3/33573* (2021.05); *H02M 1/08* (2013.01); *H02M 3/01* (2021.05)

(58) Field of Classification Search
CPC ........ H02M 3/01; H02M 3/015; H02M 3/005; H02M 3/33573; H02M 3/33576; H02M 3/33584; H02M 3/33592; H02M 3/3376; H02M 3/3385; H02M 1/08; H02M 1/088; H02M 1/096
See application file for complete search history.

(56) References Cited

U.S. PATENT DOCUMENTS

| 9,263,960 B2 | 2/2016 | Jovanović et al. |
| 2015/0078036 A1* | 3/2015 | Jovanovic ......... H02M 3/33573 363/17 |
| 2017/0063251 A1* | 3/2017 | Ye ..................... H02M 3/33576 |
| 2021/0126522 A1* | 4/2021 | Preindl ................. H02M 3/158 |
| 2021/0203236 A1 | 7/2021 | Zhang et al. |

OTHER PUBLICATIONS

Philipp Rehlaender et al, Frequency-Doubler Modulation for Reduced Junction Temperatures for LLC Resonant Converters Operated in Half-Bridge Configuration, EPE'21 ECCE Europe, IEEE, 2021.
(Continued)

*Primary Examiner* — Nguyen Tran
(74) *Attorney, Agent, or Firm* — CKC & Partners Co., LLC

(57) ABSTRACT

Full bridge converter-circuit having a H-bridge, comprising a control circuit for operating the H-bridge in a first operation mode or a second operation mode, wherein the control circuit is configured that between switching from the first operation mode to the second operation mode a morphing operation mode is applied in which a positive inverter voltage pulse length on a first half-bridge of the H-bridge is determined on the basis of a negative inverter voltage pulse length on a second half-bridge of the H-bridge.

15 Claims, 14 Drawing Sheets

(56) References Cited

OTHER PUBLICATIONS

Philipp Rehlaender et al, Frequency-Doubler Modulation for Reduced Junction Temperatures for LLC Resonant Converters Operated in Half-Bridge Configurationuration, IEEE, 2021.

Milan M. Jovanović et al., On-the-Fly Topology-Morphing Control-Efficiency Optimization Method for LLC Resonant Converters Operating in Wide Input- and or Output-Voltage Range, IEEE, 2016.

Yuqi Wei et al, Topology Morphing Control Strategies for Full-bridge LLC Converter, IEEE, 2020.

Corresponding extended European search report issued on Feb. 15, 2022.

* cited by examiner

HBM

FD-HBM

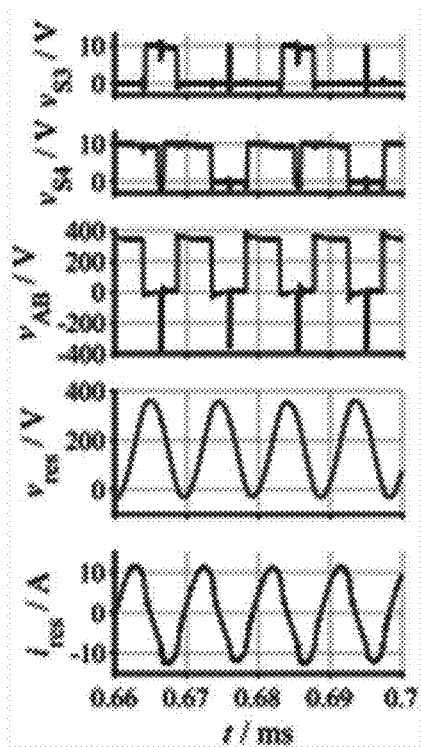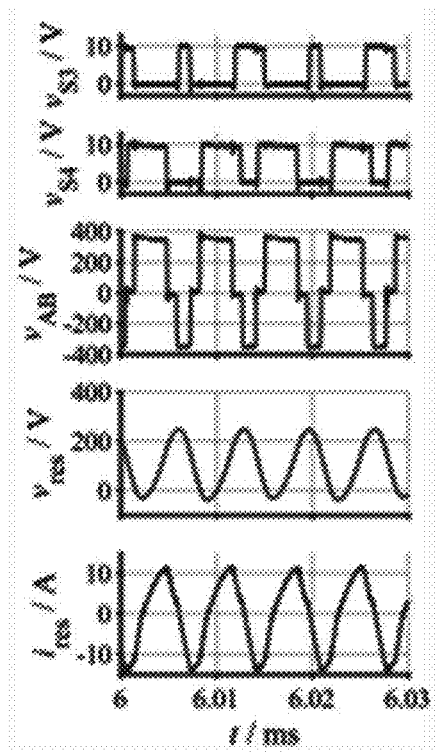
Fig. 9A  Fig. 9B
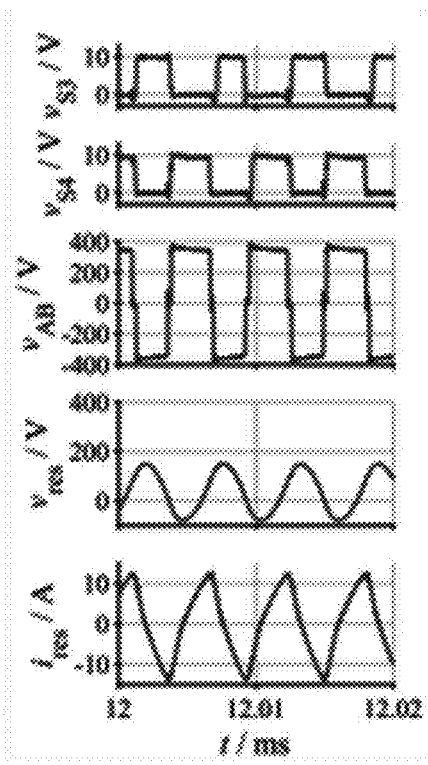
Fig. 9C

ON-THE-FLY TOPOLOGY MORPHING FOR FREQUENCY-MULTIPLIER HALF-BRIDGE OPERATION

CROSS-REFERENCE TO RELATED DISCLOSURES

This application claims priority to European Application No. EP 21192465.9, filed on Aug. 20, 2021, which is hereby incorporated by reference in its entirety.

TECHNICAL FIELD

The disclosure relates to a full bridge converter-circuit having a H-bridge and a converting method for a full bridge converter-circuit having a H-bridge.

BACKGROUND

Conventionally, an on-the-fly topology transition with a constant positive voltage pulse length of 50% of the pulse period is used, when switching a full-bridge converter from full-bridge operation to half-bridge operation and reverse. However, during such a transition the magnetizing current may increase dynamically such that the transformer core can be saturated.

Document U.S. Pat. No. 9,263,960 B2 describes an on-the-fly topology morphing modulation to morph from half bridge operating mode to the full bridge operation and reverse. One half bridge is pulsed with a constant duty cycle of 50% whereas the duty cycles of the other half-bridge switches have been adjusted to change from 50% to 0% for one switch. The other switch of the same half bridge is pulsed complimentary.

While this operation is able to reduce oscillations of the output significantly, it can result in partial saturation of the transformer core because the magnetizing current increases dynamically during the morphing process.

SUMMARY

It is the object of the disclosure to prevent partial saturation of a transformer core due to the magnetizing current that increases dynamically during a morphing process and to achieve a smooth transition from full-bridge mode to frequency multiplier mode and reverse.

The solution of the disclosure is specified by a full bridge converter-circuit.

According to the disclosure the solution is achieved by a full bridge converter-circuit having a H-bridge, comprising a control circuit for operating the H-bridge in a first operation mode or a second operation mode, wherein the control circuit is configured that between switching from the first operation mode to the second operation mode a morphing operation mode is applied in which a positive inverter voltage pulse length on a first half-bridge of the H-bridge is determined on the basis of a negative inverter voltage pulse length on a second half-bridge of the H-bridge. The positive inverter voltage pulse length can be equal to the switching time for switching a switch on the first half-bridge of the H-bridge. The negative inverter voltage pulse length can be equal to the switching time for switching a switch on the second half-bridge of the H-bridge. By dynamically adjusting the length of the positive inverter voltage pulses, a dynamic increase of the magnetizing current can be effectively limited to prevent a transformer saturation.

In a preferred embodiment of the full bridge converter-circuit the first operation mode is a full bridge operation of the H-bridge and the second operation mode is a frequency multiplier half bridge operation of the H-bridge where the switches are pulsed with a switching frequency that is at least twice the frequency of the resonant current or the first operation mode is a frequency multiplier half bridge operation of the H-bridge and the second operation mode is a full bridge operation of the H-bridge. This yields the technical benefit that the voltage-transfer ratio of the full bridge converter-circuit can be increased. Thermal imbalances are reduced or remain the same as with conventional half-bridge modulation resulting in lower junction temperatures.

In a further preferred embodiment of the full bridge converter-circuit the control circuit is configured to increase or decrease the negative inverter voltage pulse length linearly during the morphing operation mode. Increasing or decreasing can be performed with an up-down counter to achieve the pulse pattern. Linear decreasing of the second duty cycle can be performed from 0.5 to 0 over time and linear increasing of the second duty cycle can be performed from 0 to 0.5 over time. This yields the technical benefit that a smooth morphing operation from one operation mode to the other is achieved.

In a further preferred embodiment of the full bridge converter-circuit the full bridge converter-circuit comprises a look up table for looking up the positive inverter voltage pulse length on the basis of the negative inverter voltage pulse length. This yields the technical benefit that values of the first duty cycle can be determined fast and reliably.

In a further preferred embodiment of the full bridge converter-circuit the positive inverter voltage pulse length is adjusted based on the measurements of a magnetic field sensor or the positive inverter voltage pulse length is adjusted based on online calculations. This yields the technical benefit that an even better adjusting result can be achieved.

In a further preferred embodiment of the full bridge converter-circuit the look up table is stored in a digital memory of the control circuit. The digital memory can be a random access memory (RAM) or a read only memory (ROM). This yields the technical benefit that the control circuit has quick access to the value of the first duty cycle.

In a further preferred embodiment of the full bridge converter-circuit a functional graph representing the dependency of the positive inverter voltage pulse length on the negative inverter voltage pulse length has a minimum. This yields the technical benefit that the magnetizing current can be reduced effectively.

In a further preferred embodiment of the full bridge converter-circuit the minimum is between a value of 0.2 and 0.3 of the negative inverter voltage pulse length and/or between a value of 0.2 and 0.3 of the positive inverter voltage pulse length. This yields the technical benefit that the magnetizing current can be reduced even more effectively.

In a further preferred embodiment of the full bridge converter-circuit the functional graph is V-shaped. This also yields the technical benefit that the magnetizing current can be reduced effectively.

In a further preferred embodiment of the full bridge converter-circuit to the value of 0 of the negative inverter voltage pulse length a value of 0.5 of the positive inverter voltage pulse length is assigned and/or to the value of 0.5 of the negative inverter voltage pulse length a value of 0.5 of the positive inverter voltage pulse length is assigned. This yields the technical benefit that the dynamic increase of the magnetization current can be reduced to a large extend.

In a further preferred embodiment of the full bridge converter-circuit the full bridge converter-circuit is an LLC resonant converter. This yields the technical benefit that an appropriate circuit is applied.

According to the disclosure the solution is also achieved by a converting method for a full bridge converter-circuit having a H-bridge, comprising the steps of operating the H-bridge in a first operation mode; operating the H-bridge in a morphing operation mode in which a positive inverter voltage pulse length on a first half-bridge of the H-bridge is determined on the basis of a negative inverter voltage pulse length on a second half-bridge of the H-bridge; and operating the H-bridge in a second operation mode. By this converting method same technical benefits can be achieved as with the aforementioned full bridge converter-circuit.

In a preferred embodiment of the converting method the negative inverter voltage pulse length is increased or decreased linearly during the morphing operation mode. This also yields the technical benefit that a smooth morphing operation from one operation mode to the other is achieved.

In a further preferred embodiment of the converting method the positive inverter voltage pulse length is stored in a look up table on the basis of the negative inverter voltage pulse length. This also yields the technical benefit that values of the first duty cycle can be determined fast and reliably.

In a further preferred embodiment of the converting method the look up table is stored in a digital memory of the control circuit. This also yields the technical benefit that the control circuit has quick access to the value of first duty cycle.

In a further preferred embodiment of the converting method the look up table is derived from simulations in which a pulse length is adjusted to control the magnetizing current.

This yields the technical benefit that an optimum relationship between the first duty cycle and the second duty cycle can be determined.

Other advantageous embodiments and combinations of features come out from the detailed description below and the entirety of the claims.

BRIEF DESCRIPTION OF DRAWINGS

The drawings used to explain the embodiments show:

FIG. 9A to FIG. 9C are experimental measurement results of a symmetrical morphing transition;

In the figures, the same components are given the same reference symbols.

DESCRIPTION OF EMBODIMENTS

Figure 1:
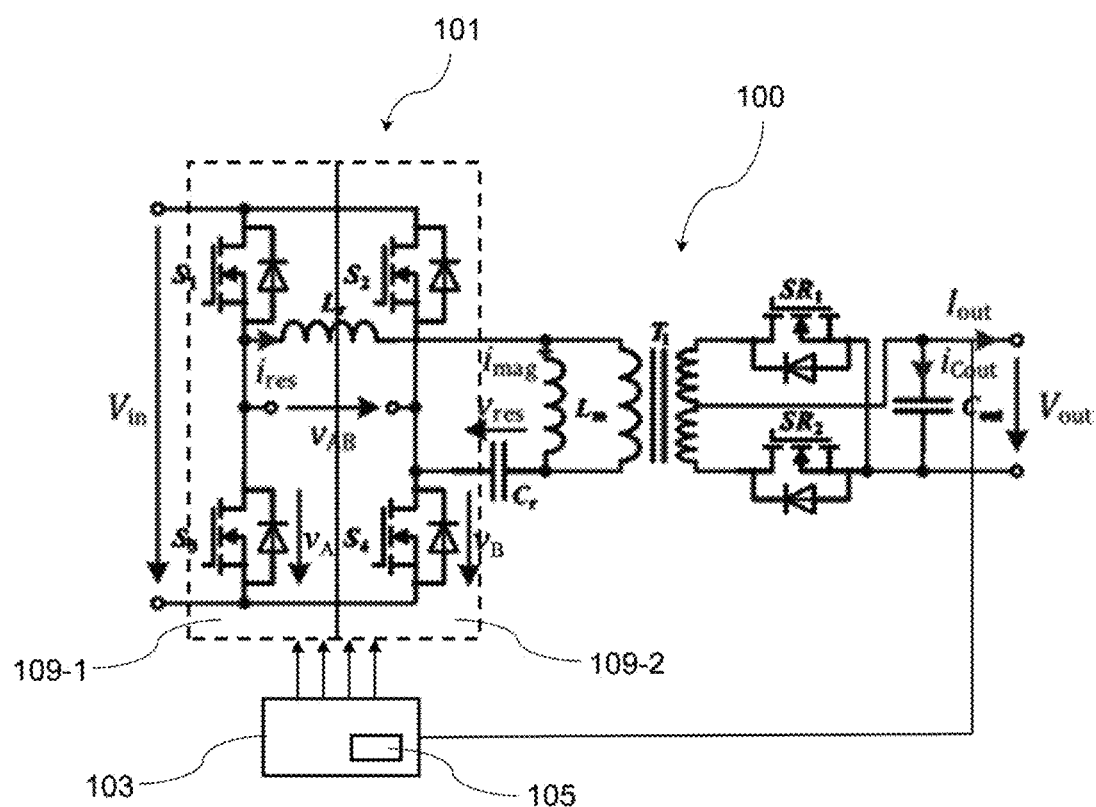
FIG. 1 is a circuit diagram of an LLC resonant converter.

FIG. 1 shows a circuit diagram of an LLC resonant converter as a full bridge converter-circuit 100 having an H-Bridge 101. The H-Bridge 101 comprises a first half bridge 109-1 having the switches $S_1$ and $S_3$ and a second half bridge 109-2 having the switches $S_2$ and $S_4$. A control circuit 103 serves for controlling each of the switches $S_1$, $S_2$, $S_3$ and $S_4$.

The switches $S_1$, $S_2$, $S_3$ and $S_4$ are implemented by suitable Metal-Oxide-Semiconductor Field-Effect Transistors (MOSFET).

Conventional LLC converters are not suitable for a wide voltage-transfer ratio as it results in a wide switching frequency range. To ensure a sufficient gain, the inductance ratio $L_r/L_m$ needs to be designed small leading to large resonant currents that have a detrimental effect on the efficiency. Therefore, the LLC resonant converter is best applied near resonance. However, to cover a wide voltage-transfer ratio, an LLC full-bridge converter can be operated in half-bridge operation mode instead to a full bridge operation mode. In this case one of the switches $S_1$, $S_2$, $S_3$ and $S_4$ is turned on continuously, whereas the other corresponding switch $S_1$, $S_2$, $S_3$ and $S_4$ of the respective bridge leg is permanently turned off. This, however, leads to large conduction losses of the permanently turned-on switch (no switching losses) while the switch that is turned off exhibits no losses. Each switch $S_1$, $S_2$, $S_3$ and $S_4$ that is pulsed, on the other hand, exhibits half the conduction losses of the switch $S_1$, $S_2$, $S_3$ and $S_4$ that is permanently turned on and additional switching losses.

The full-bridge converter 100 with a blocking capacitor in the resonant path is operated in half-bridge mode to decrease the gain of this specific mode and, thus, increase the gain range of the converter. While in the conventional full-bridge operation the inverter voltage is pulsed between $v_{AB} \in \{-V_{in}; +V_{in}\}$, in half-bridge operation mode the inverter voltage is pulsed between $v_{AB} \in \{-V_{in}; 0\}$ or $v_{AB} \in \{0; V_{in}\}$. The resonant capacitor Cr hereby acts as a blocking capacitor as the average voltage is half the input voltage. As the blocking capacitor is charged to half the input voltage, the effective input voltage of the transformer is reduced by a factor of two. This reduces the gain by a factor of two making this operation mode especially useful for small voltage-transfer ratios whereas for large voltage-transfer ratios the conventional full-bridge operation can be employed.

For intermediate gains and loads, phase-shift operation is beneficial to reduce the switching frequency and increase the efficiency. To change the operation mode from full-bridge operation to half-bridge operation and reverse, an on-the-fly topology morphing operation mode is applied between switching from the one mode to the other.

If the LLC converter 100 is operated in half-bridge operation mode, one switch $S_1$, $S_2$, $S_3$ and $S_4$ conducts the full resonant current while exhibiting no switching losses. The respective other switch $S_1$, $S_2$, $S_3$ and $S_4$ of this half-bridge 109-1 or 109-2 is permanently turned off such that this switch is not stressed at all. The switches $S_1$, $S_2$, $S_3$ and $S_4$ of the pulsing half bridge 109-1 or 109-2 conduct the resonant current for one half of a period such that they are stressed with half the conduction losses compared to the switch $S_1$, $S_2$, $S_3$ and $S_4$ that is permanently turned on. However, they exhibit turn-off losses.

This leads to imbalanced inverter losses. For dominant conduction losses, the switch that is permanently turned on is stressed with much larger losses than the pulsing switch.

If the switching losses are dominant, the pulsing switches $S_1$, $S_2$, $S_3$ and $S_4$ exhibit larger losses compared to the switch $S_1$, $S_2$, $S_3$ and $S_4$ that is permanently turned on.

The frequency-multiplier modulation (FMM) is a beneficial alternative to the conventional half-bridge modulation (HBM) to reduce the maximum junction temperature. While both half bridges 109-1 or 109-2 are pulsed with half the operating frequency, the resulting inverter voltage has a multiple integer of the frequency of the half bridges 109-1 or 109-2. The FMM can be applied for the conventional full-bridge LLC converter 100. As this modulation emulates the HBM it will be referred to as frequency-multiplier half-bridge modulation (frequency-multiplier half-bridge modulation, FM-HBM). This modulation is an alternative to the conventional HBM.

By employing the FM-HBM, the maximum junction temperature can be reduced significantly and should be the preferred modulation when employing half-bridge configuration. Furthermore, a simple-to-implement modulation is used to morph in operation on-the-fly from full-bridge to FM-HBM and back.

FIG. 2A to 2D show four possible HBMs for an LLC resonant converter 100. The switches $S_1$, $S_2$, $S_3$ and $S_4$ of a full-bridge inverter are switched to achieve four different switching states: in two energy-transfer (ET) states energy may be transferred from the input to the resonant tank or the output. In the other two freewheeling (FW) states, the inverter voltage is zero such that no energy is transferred from the input to the resonant tank or the output. The following list shows all of the four switching states with the appropriate switches that are turned on:

ET+: $S_1$ and $S_4 \rightarrow v_{AB}=V_{in}$
ET−: $S_2$ and $S_3 \rightarrow vAB=-Vin$
FW+: $S_1$ and $S_2 \rightarrow vAB=0$
FW−: $S_3$ and $S_2 \rightarrow vAB=0$ When employing the conventional HBM, one leg of the inverter is not pulsed-one switch is permanently turned on while the other switch is permanently turned off. All potential HBM schemes are depicted in FIG. 2A to FIG. 2D. Intervals with $v_{AB}=0$ are depicted in blue for FW'-intervals and in red for FW'-intervals.

Figure 2A:
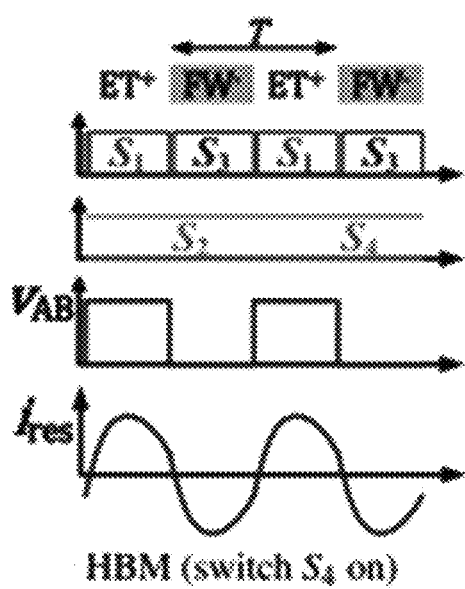
FIG. 2A to FIG. 2D are four possible half bridge modulations for an LLC resonant converter.
Figure 2B:
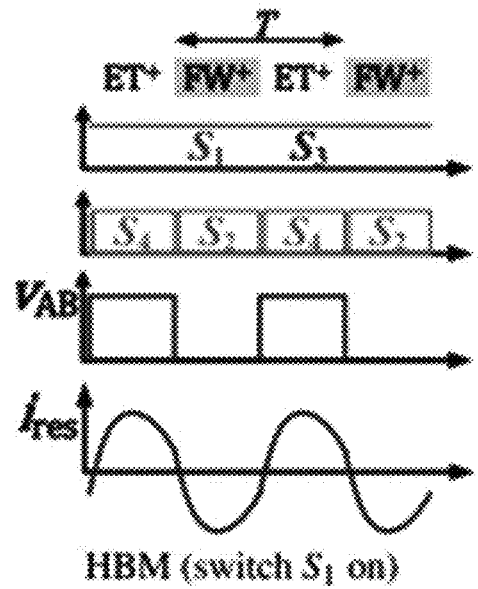
Figure 2C:
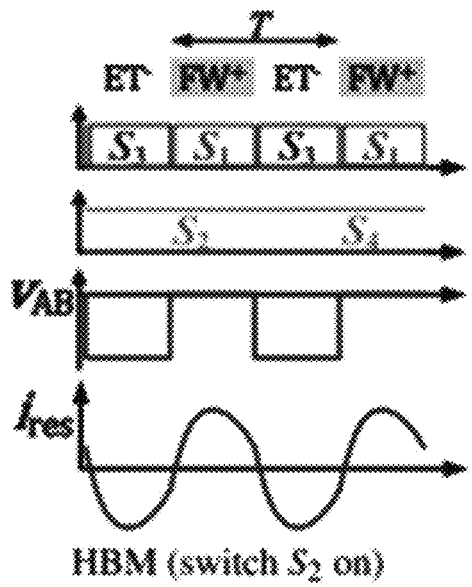
Figure 2D:
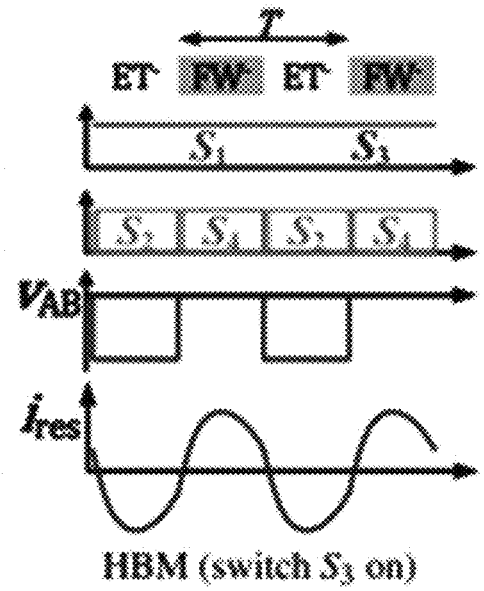

FIG. 2A and FIG. 2B show modulations that result in a positive (or zero) inverter voltage (the average resonant capacitor voltage is $v_{res}=\frac{1}{2}V_{in}$), whereas FIG. 2C and FIG. 2D show modulations that result in only negative (or zero) inverter voltages (the average resonant capacitor voltage is $v_{res}=-\frac{1}{2}V_{in}$). Modulations in FIG. 2B and FIG. 2C cannot be achieved with bootstrap drivers since the high-side switches cannot be permanently turned on with this driver supply. The modulations in FIG. 2A and FIG. 2B as well as modulations in FIG. 2C and FIG. 2D result in an equal inverter output voltage $v_{AB}$ and, thus, in equal resonant currents. Assuming that MOSFETs are employed as the inverter switches $S_1$, $S_2$, $S_3$ and $S_4$, the losses of the individual switches $S_1$, $S_2$, $S_3$ and $S_4$ that are pulsed can be calculated as:

$$P_{compl}^{HBM} = \overbrace{\frac{1}{2}I_{res}^2 R_{ds,on}(\vartheta_j)}^{P_{cond,compl}^{HBM}} + \overbrace{f_{SW}E_{off}(i_{off})}^{P_{sw,compl}^{HBM}} \quad (1)$$

To evaluate the distribution of the losses, the losses of these switches $S_1$, $S_2$, $S_3$ and $S_4$ are divided into the conduction losses $P_{cond,compl}^{HBM}$ and the switching losses $P_{sw,compl}^{HBM}$. The switch $S_1$, $S_2$, $S_3$ and $S_4$ that is permanently turned on is stressed with the full resonant current such that the losses can be calculated as:

$$P_{p\text{-}on}^{HBM} = I_{res}^2 R_{ds,on}(\vartheta_j) \quad (2)$$

Assuming that the same MOSFET type is employed for all switches $S_1$, $S_2$, $S_3$ and $S_4$ and neglecting temperature dependencies of the on-state resistance $R_{ds,on}$, the overall inverter losses can be calculated as $P_{inv}=2I_{res}^2 R_{ds,on}+2f_{sw}E_{off}(i_{off})$. The conduction losses of the switch $S_1$, $S_2$, $S_3$ and $S_4$ that is permanently turned on are twice as large as the conduction losses of the pulsed switches $S_1$, $S_2$, $S_3$ and $S_4$ ($P_{p\text{-}on}^{HBM}=2P_{cond,compl}^{HBM}$). This may be a problem for converters that employ switches where conduction losses are the dominant loss contributor—in this case the switches $S_1$, $S_2$, $S_3$ and $S_4$ are designed for a lower on-state resistance, which results in larger conversion costs.

Figure 3A:
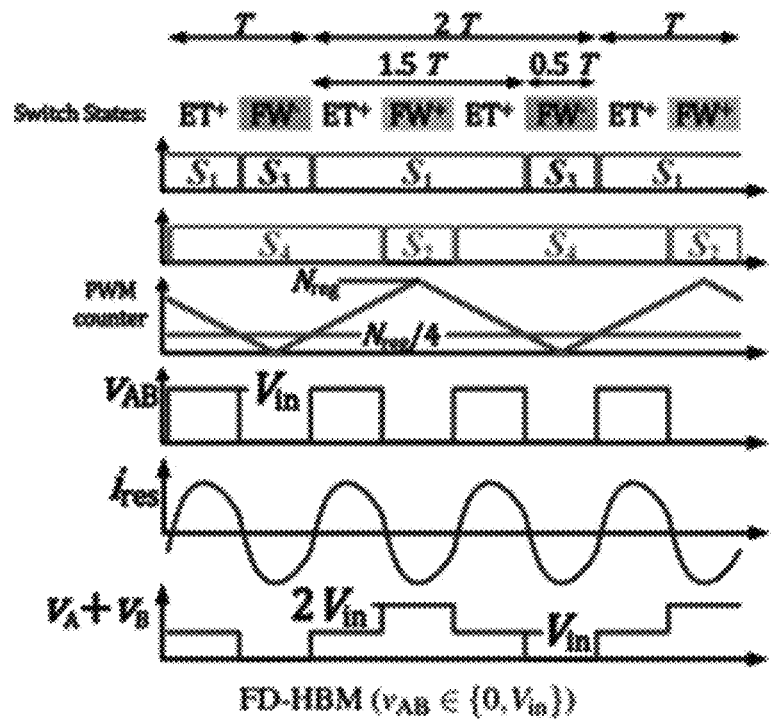
FIG. 3A and FIG. 3B are frequency multiplied half bridge modulations employed on the LLC converter.
Figure 3B:
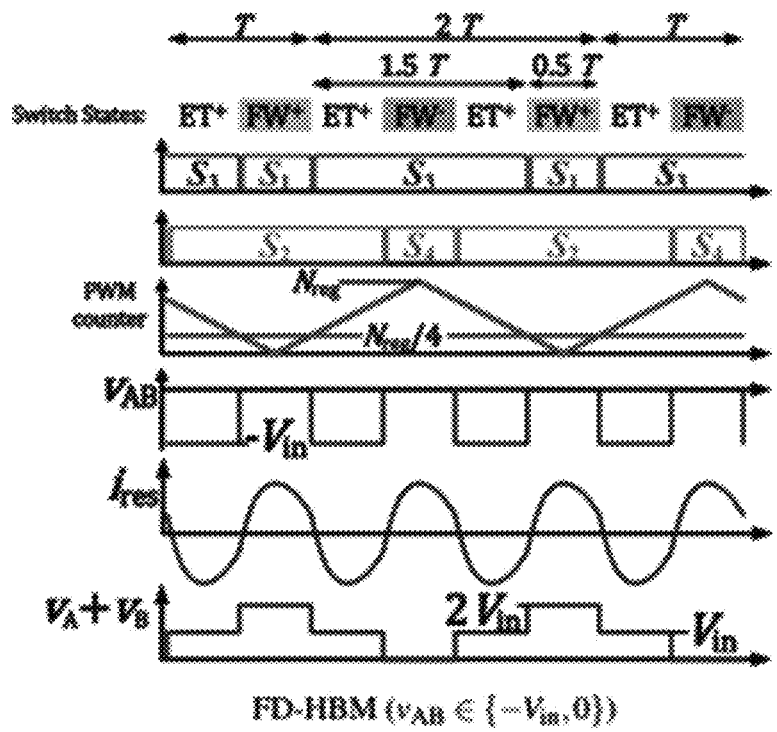

From the afore described FIG. 2 it is evident that two modulations achieve exactly the same inverter voltage. Therefore, it is possible to interchange the freewheeling intervals FW+ and FW− as depicted in FIG. 3A and FIG. 3B without modifying the inverter voltage $v_{AB}$. By including both FW+ and FW− intervals into the modulation, the switching frequency of $S_1$ and $S_2$ reduces while the operating frequency of the LLC remains the same. The operating frequency is, thus, multiplied compared to the switching frequency of the individual switches. Therefore, these modulations are labeled frequency-multiplier modulation or frequency-multiplier half-bridge modulation.

FIG. 3A and FIG. 3B show a frequency-doubler half-bridge modulation FD-HBM with a switching frequency of half the operating frequency. The FD-HBM is a specific example of the FM-HBM that is employed on the LLC converter 100. The modulation consists of intervals of the length 3 T/2 and T/2, which are phase shifted for one bridge leg by T. The pulses of the switches $S_1$, $S_2$, $S_3$ and $S_4$ thus repeat their pattern every 2T.

Employing this concept, asymmetrical pulse patterns result for both half bridges 109-1 and 109-2, which are phase-shifted by T. Considering FIG. 3A and FIG. 3B, the modulation utilizes an up-down counter to achieve the pulse pattern. It is equally possible to employ any other counter. However, an up-down counter is beneficial in an on-the-fly morphing operation and is also employed to achieve balanced losses for an operation in phase-shift mode. This avoids the necessity of a PWM reconfiguration.

Two distinct types of switches $S_1$, $S_2$, $S_3$ and $S_4$ can be distinguished: the switches that are turned on 75% of the time, resulting in high losses and the switches that are turned on for the remaining 25% of the time, resulting in lower losses. The high losses $p_{high}^{FD\text{-}HBM}$ of the switches that are turned on 75% of the time can be calculated as:

$$P_{high}^{FD\text{-}HBM} = \overbrace{\frac{3}{4}I_{res}^2 R_{ds,on}(\vartheta_j)}^{1.5P_{cond,compl}^{HBM}=0.75P_{p\text{-}on}^{HBM}} + \overbrace{\frac{1}{2}f_{SW}E_{off}(i_{off})}^{0.5P_{sw,compl}^{HBM}} \quad (3)$$

The overbrace puts these losses in relation to the conventional HBM while neglecting temperature dependencies of the on-state resistance. The switches are turned off every two periods T of the resonant current while the switches conduct for three quarters of a period. The lower losses $p_{low}^{FD\text{-}HBM}$ of the switches that are only turned on for 25% of the time on the other hand can be calculated as $$P_{low}^{FD\text{-}HBM} = \overbrace{\frac{1}{4}I_{res}^2 R_{ds,on}(\vartheta_j)}^{0.5 P_{cond,compl}^{HBM} = 0.25 P_{p\text{-}on}^{HBM}} + \overbrace{\frac{1}{2}f_{SW}E_{off}(i_{off})}^{0.5 P_{sw,compl}^{HBM}} \qquad (4)$$

Thus, the overall losses $P_{inv}$ of this modulation are the same compared to the conventional HBM. To evaluate the performance of this modulation, the HBM and the FM-HBM are evaluated for different loss distributions of the conduction losses and the switching losses. The reference is the conventional HBM.

Figure 4:
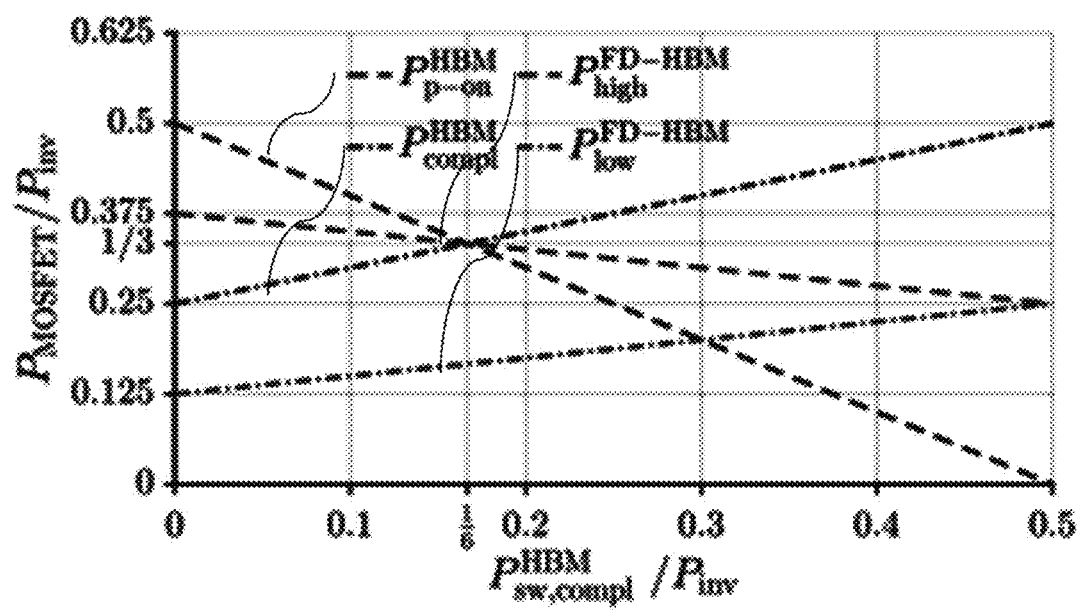
FIG. 4 is a loss analysis assuming a constant on-state resistance.

FIG. 4 shows a loss analysis assuming a constant on-state resistance $R_{ds,on}$. The losses of the switches $S_1$, $S_2$, $S_3$ and $S_4$ are depicted over the ratio of the switching losses $P_{sw,compl}^{HBM}$ to the overall losses of the operation $P_{inv}$. Obviously, the FM-HBM distributes the losses more equally among all switches $S_1$, $S_2$, $S_3$ and $S_4$ compared to the conventional HBM. While for $P_{sw,compl}^{HBM}/P_{inv} < \frac{1}{6}$ dominant conduction losses in $P_{compl}^{HBM}$), the switch that is permanently turned on experiences the largest losses, for $P_{sw,compl}^{HBM}/P_{inv} > \frac{1}{6}$ (dominant switching losses in $P_{compl}^{HBM}$), the switches that are switched face the largest losses.

The switch $S_1$, $S_2$, $S_3$ or $S_4$ being subject to the largest losses of the FM-HBM ($P_{high}^{FM\text{-}HBM}$) always shows lower or identical overall losses than the most-stressed switch $S_1$, $S_2$, $S_3$ and $S_4$ of the conventional HBM. Only for $P_{sw,compl}^{HBM}/P_{inv} = \frac{1}{6}$, where the conduction and switching losses are equal in $P_{compl}^{HBM}$ ($P_{sw,compl}^{HBM} = P_{cond,compl}^{HBM}$), the losses of the maximum stressed switches $S_1$, $S_2$, $S_3$ or $S_4$ in the HBM are the same as the maximum stressed switches $S_1$, $S_2$, $S_3$ or $S_4$ in the FM-HBM. The HBM and FM-HBM can for example be both employed on an LLC converter 100 utilizing silicon-carbide (SIC) MOSFETs of type SCT3120AW7 (Rohm, 650 V, 120 mΩ @ 25° C.) in the operating point $V_{in}$=350 V, $V_{out}$=11.5 and $I_{out}$=125 A.

Figure 5A:
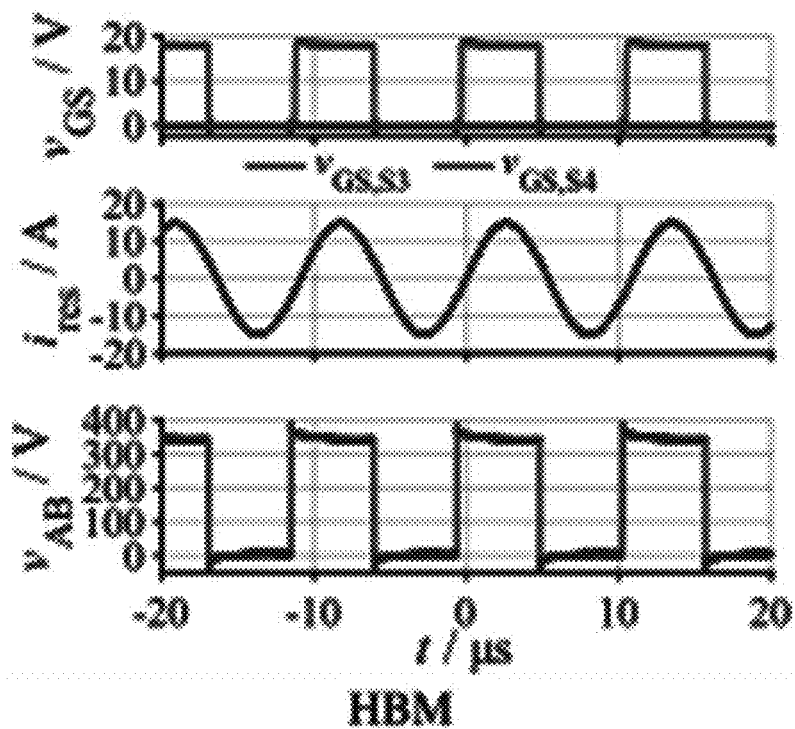
FIG. 5A and FIG. 5B are experimental measurement results of the frequency multiplied half bridge modulation.
Figure 5B:
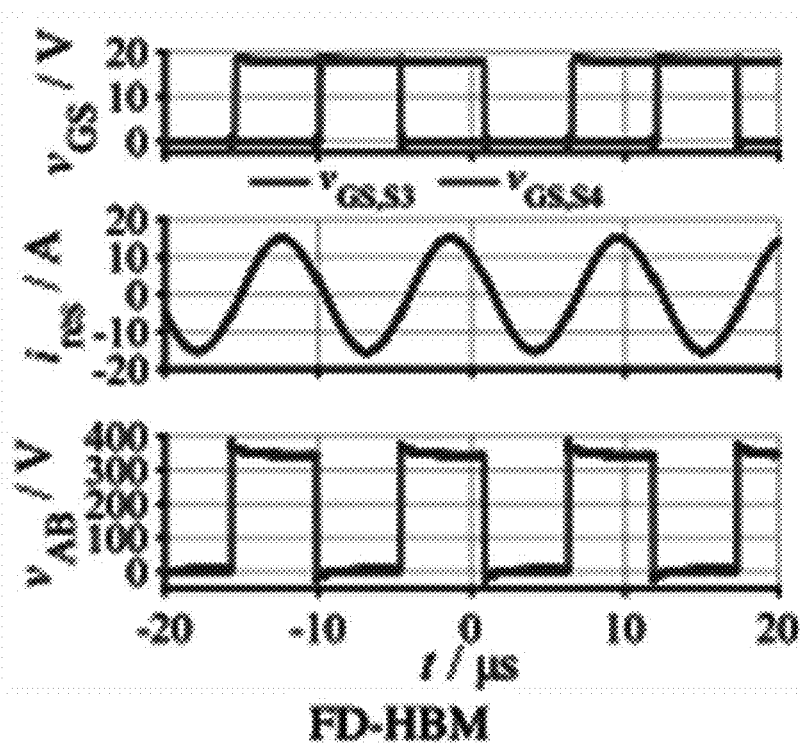

FIGS. 5A and 5B shows experimental measurement results of the HBM and FM-HBM. Depicted are the low-side gate voltages $v_{GS,S3}$ and $v_{GS,S4}$, the resonant current $i_{res}$ and the inverter voltage $v_{AB}$. Both modulations result in about equal inverter voltages and resonant currents. The measured efficiencies are identical.

Figure 6A:
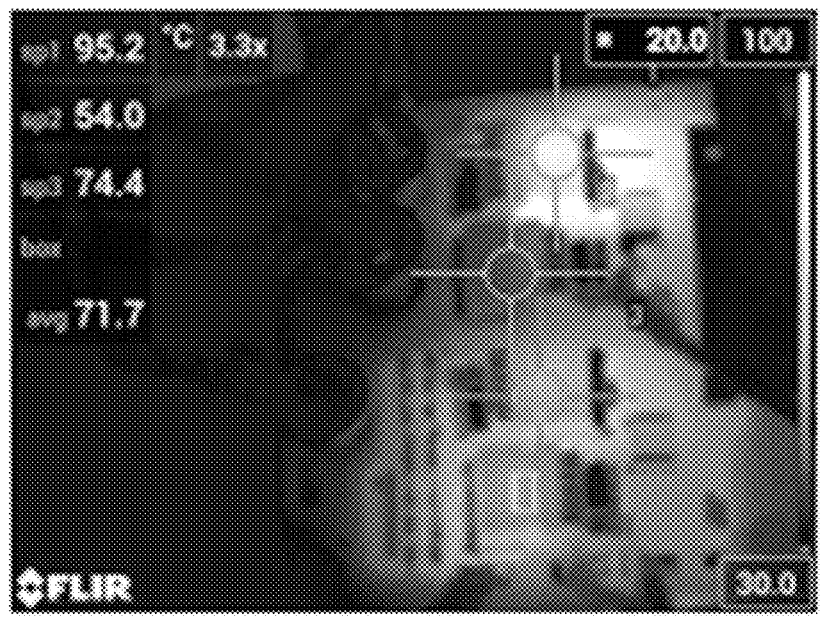
FIG. 6A and FIG. 6B are half-bridge configuration with half bridge modulations and frequency multiplied half bridge modulation.
Figure 6B:
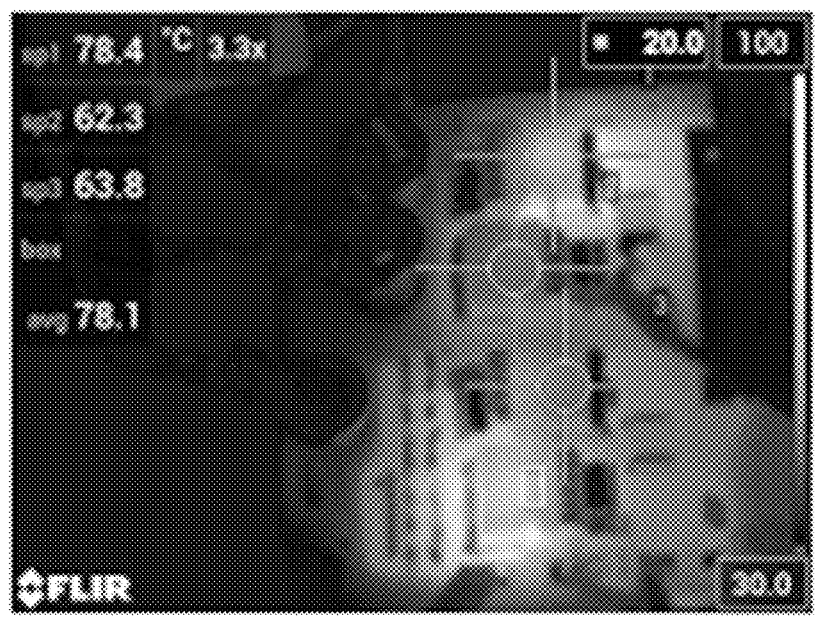

FIG. 6A shows an LLC half-bridge configuration with HBM and FIG. 6B shows a FM-HBM in a thermal analysis. FIG. 6A depicts the modulation of FIG. 2B, while FIG. 6B depicts the modulation of FIG. 3A. From top to bottom the switches (shown by the marker) are: $S_1$, $S_2$, $S_3$ and $S_4$. The FM-HBM reduces the maximum temperature by about 17 K. For the depicted operation, conduction losses are the dominant loss contributor. The results are at thermal steady state at the same operating conditions.

Figure 7A:
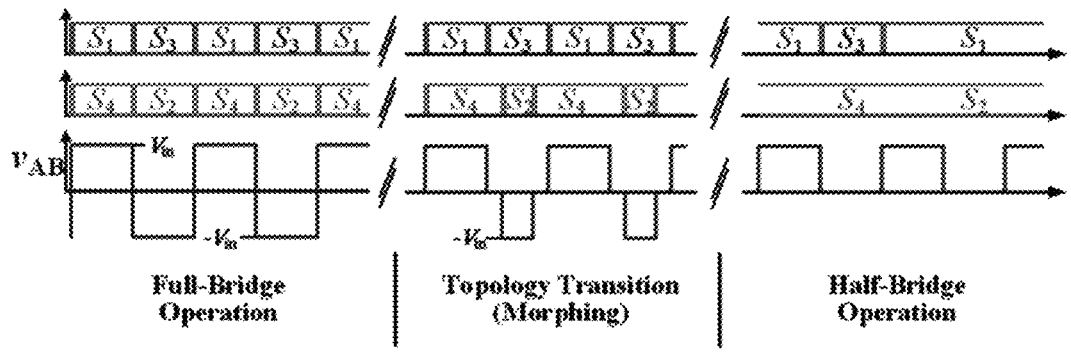
FIG. 7A to FIG. 7C are on-the-fly morphing transition from full-bridge modulation to half-bridge configuration.
Figure 7B:
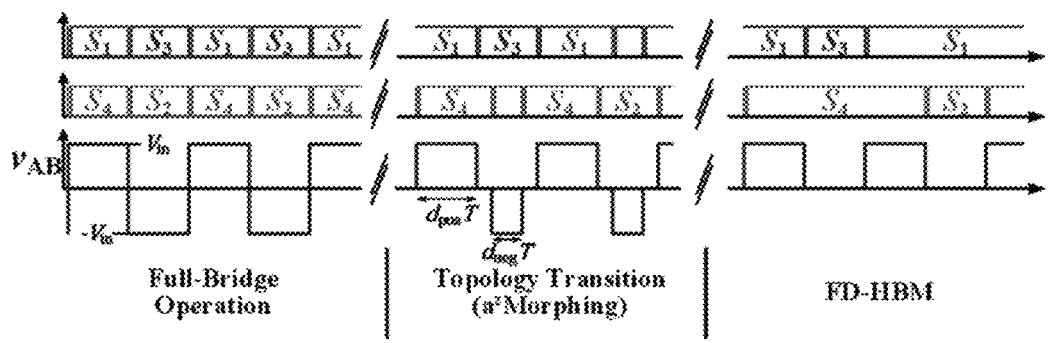
Figure 7C:
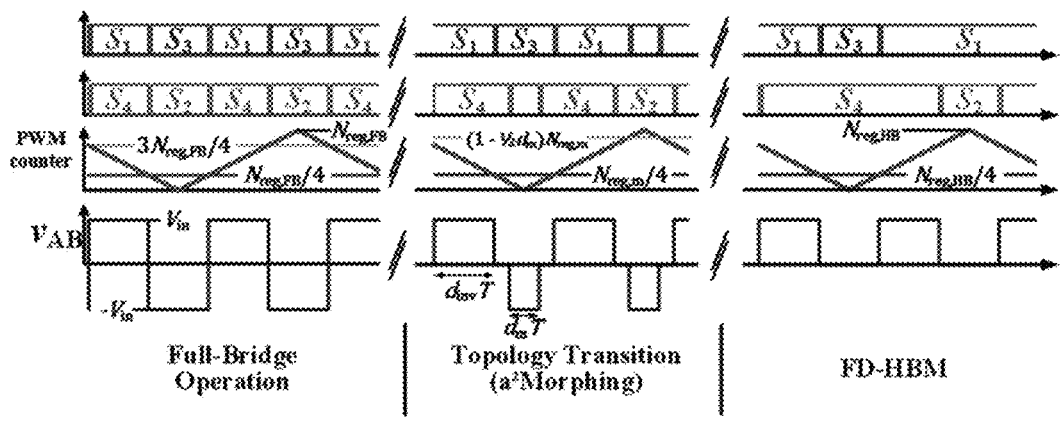

FIG. 7A to FIG. 7C show an on-the-fly morphing transition full-bridge to half-bridge mode and back. FIG. 7A shows a transition to the conventional half-bridge configuration and FIG. 7B a transition to the FM-HBM. For FIG. 7B, one compare value is shifted to achieve the morphing modulation. FIG. 7C includes the triangle modulation for determining the duty cycles.

To change the operating mode from full-bridge to half-bridge mode and back, an intermediate on-the-fly topology morphing method is used. For this transition, the lowside duty cycle of one half-bridge is slowly increased from 50% to 100% whereas the high-side switch of the respective half bridge 109-1 and 109-2 is switched complimentary. For a transition from half-bridge to full-bridge operation, this method is reversed.

While the duty cycle of all switches changes only by 25% when transitioning between the full-bridge modulation and the FM-HBM, the average resonant capacitor voltage is adjusted from $\bar{v}_{res}$=0 to $\bar{v}_{res}$=$V_{inv}$/2 (or to $\bar{v}_{res}$=$-V_{inv}$/2 if the other half-bridge configuration is employed). The sudden change from half-bridge configuration to full bridge configuration results in current or voltage breakdowns or overshoots. Considering the change of the switching frequency and resonant capacitor voltage a large overshoot/undershoot of the (photovoltaic) voltage and current is observed. A sudden transition from full-bridge to FM-HBM and back leads to an output voltage overshoot of 44% when transitioning from FM-HBM to full-bridge modulation and to an undershoot of 36% in the reverse direction. A feed-forward control adjusting the switching frequency is able to reduce this over-/undershoot.

However, since the switching frequency depends on the components of the resonant tank, component deviations affect the system behavior such that this type of control may be problematic if the exact component values are not matched. Furthermore, the switching frequency depends on the output load, which requires that the load must be known at the instance of the transition.

Employing the FM-HBM, it is equally possible to control the morphing from full-bridge to FM-HBM modulation and back (visualized for the Frequency Multiplier operation in FIG. 7B. The operation is hereby achieved also with an up-down counter. During the morphing operation mode one of the reference values is slowly adjusted to achieve the morphing modulation while the frequency is adjusted to achieve a steady output voltage/current. Since the modulation does not alter the shape of the inverter voltage, the traits of the morphing modulation remain the same: the magnetizing current still needs to be addressed in the design process and may still increase dynamically during the morphing transition. Furthermore, similar to the conventional morphing method, this modulation also results in a hard turn-on of the switches $S_1$, $S_2$, $S_3$ or $S_4$ close to the FMHBM.

Figure 8A:
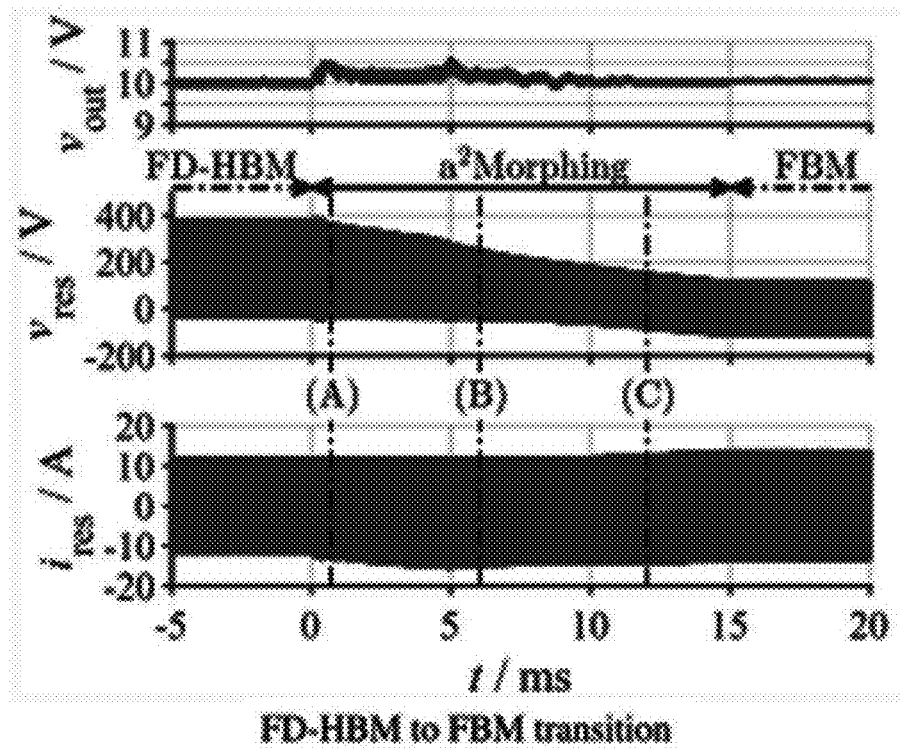
FIG. 8A and FIG. 8B are experimental measurement results of an alternating asymmetrical morphing transition.
Figure 8B:
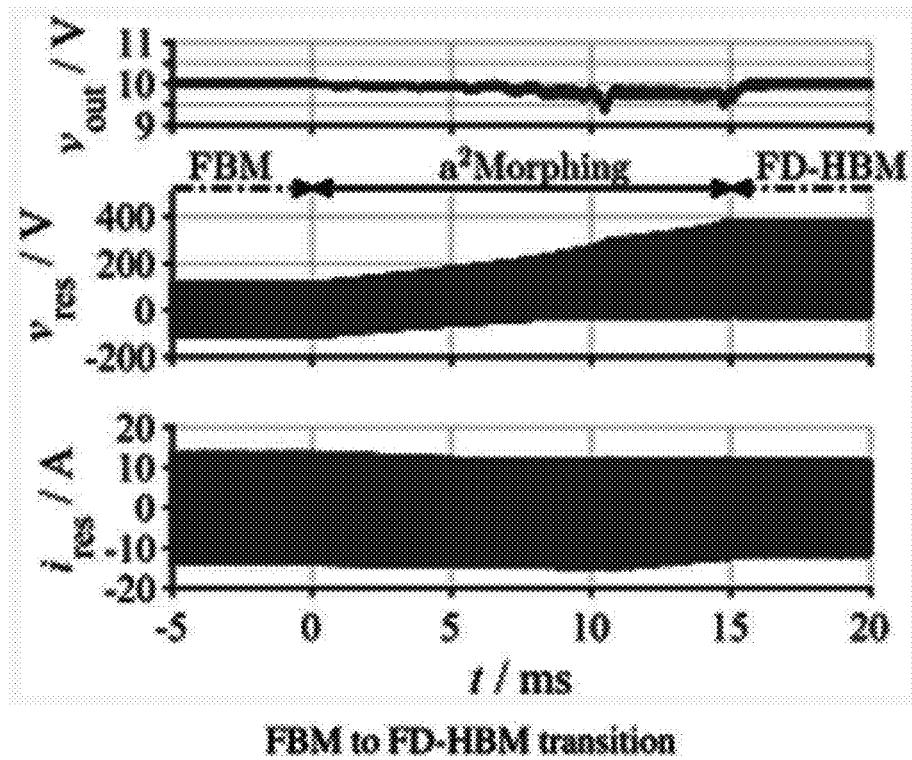

FIG. 8A and FIG. 8B show experimental measurement results of the alternating asymmetrical (a2) morphing transition. FIG. 8A shows a transition from FD-HBM as an example of the FM-HBM to FBM, the intersections (A)-(C) show the intervals that are depicted in FIG. 9A to FIG. 9C. FIG. 8B shows a transition from FBM to FM-HBM. The alternating asymmetrical (a2) morphing as depicted in FIG. 7B in both directions can be implemented on an LLC converter 100 for the operating point $V_{in}$=350 V, $V_{out}$=10 V and $I_{out}$=100 A. The transition results in an output voltage ($V_{out}$) over/undershoot of about 6%.

FIG. 9A to FIG. 9C show experimental measurement results of the a2 morphing transition. Different time intervals of the transition process in FIG. 8A are depicted in FIG. 9A to FIG. 9C. The gate voltages $v_{s3}$ and $v_{s4}$, the inverter voltage $v_{AB}$ and the resonant voltage $v_{res}$ and current $i_{res}$ at different times in the FM-HBM to full-bridge transition of FIG. 8B are visualized.

Figure 10:
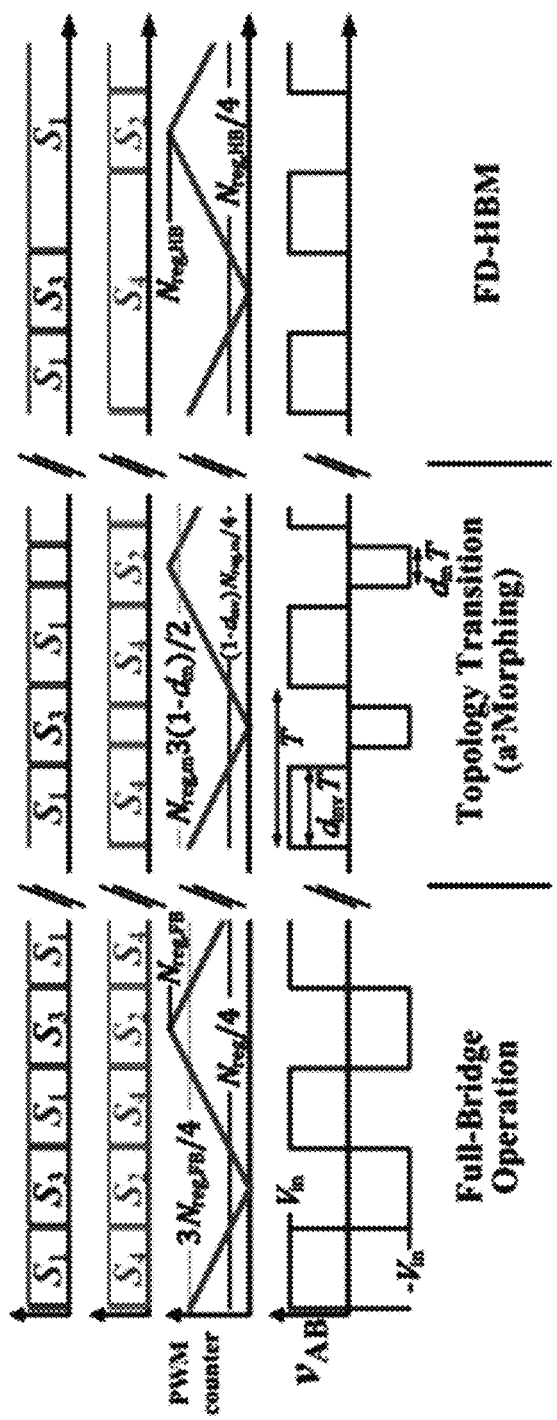
FIG. 10 is an improved morphing operation from full-bridge to FD-HBM.

FIG. 10 shows an improved morphing operation from full-bridge to FD-HBM. The inverter voltage can, however, be equally transferred to the conventional morphing process. In his morphing operation mode, the positive inverter voltage pulse length $d_{pos}*T$ on the first half-bridge 109-1 of the H-bridge 101 is determined on the basis of the negative inverter voltage pulse length $d_{neg}*T$ on the second half-bridge 109-2 of the H-bridge 101.

The positive inverter voltage pulse length $d_{pos}*T$ can be equal to the switching time $d_{inv}*T$ for switching a switch $S_1$, $S_3$ on the first half-bridge of the H-bridge, where $d_{inv}$ is the duty cycle and T the time length of the switching period. The negative inverter voltage pulse length $d_{neg}*T$ can be equal to the switching time $d_{morph}*T$ for switching a switch $S_2$, $S_4$ on the second half-bridge of the H-bridge, where $d_{morph}$ is the duty cycle and T the time length of the switching period.

This morphing operation mode differs from the above in that the constant duty cycle $d_{inv}$ is replaced by a dynamic duty cycle $d_{inv}$ the value of which is dependent on the value of the duty cycle $d_m$. In this morphing operation mode, the magnetizing current can be effectively limited to prevent a saturation of the transformer. The relationship between the duty cycle $d_{inv}$ and duty cycle $d_m$ can be stored in a lookup table (LUT). The lookup table can be stored in a digital memory 105 of the control circuit 103. The lookup table can be derived using simulation results where a controller adjusts the pulse length to control the magnetizing current.

Figure 11:
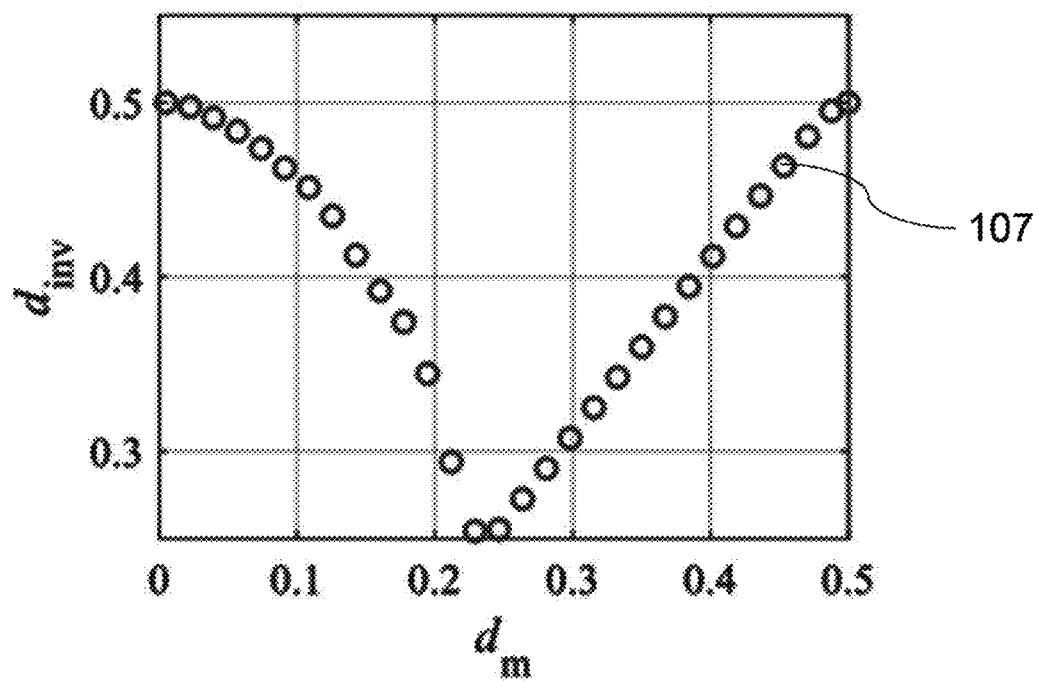
FIG. 11 is a functional graph representing the dependency of duty cycles.

FIG. 11 shows a functional graph 107 representing the dependency of the duty cycle $d_{inv}$ on the second duty cycle $d_m$. The functional graph 107 is stored as discrete values in the lookup table. The functional graph 107 is obtained for the resonant tank parameters $L_r$=30 µH, $L_m$=200 µH and $C_r$=90 nF. The functional graph 107 is V-shaped and has a minimum between a value of 0.2 and 0.3 of the duty cycle $d_m$ and between a value of 0.2 and 0.3 of the first duty cycle $d_{inv}$.

Figure 12:
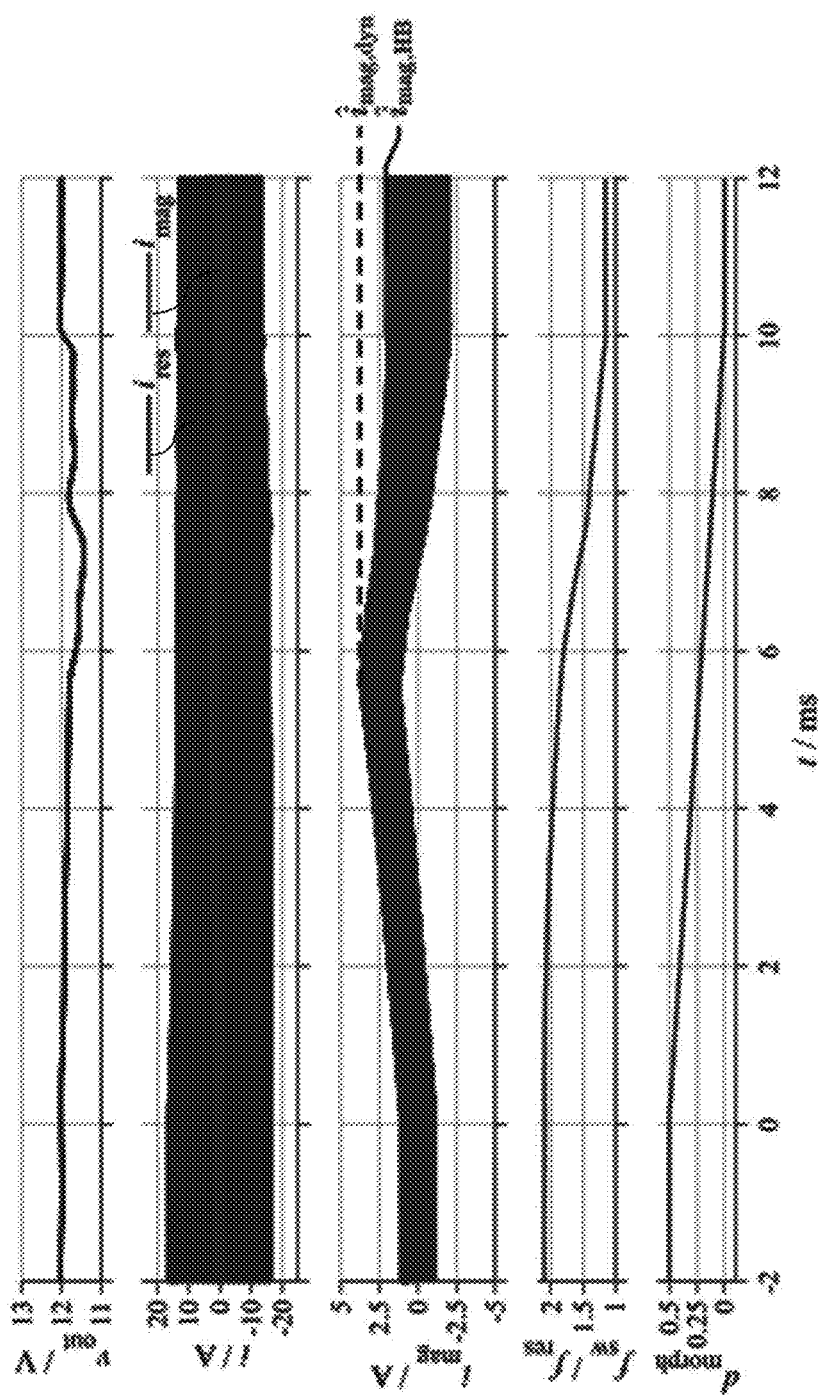
FIG. 12 is a conventional morphing transition with a constant duty cycle.

FIG. 12 shows a conventional morphing transition with a constant duty cycle. The on-the-fly topology transition is achieved with a constant positive voltage pulse length of $t_{inv}$=0.5 T, where T is the pulse period. During the transition, the magnetizing current may increase dynamically such that the transformer core can be saturated. The magnetizing current increases dynamically by 70% compared to the steady-state value.

Figure 13:
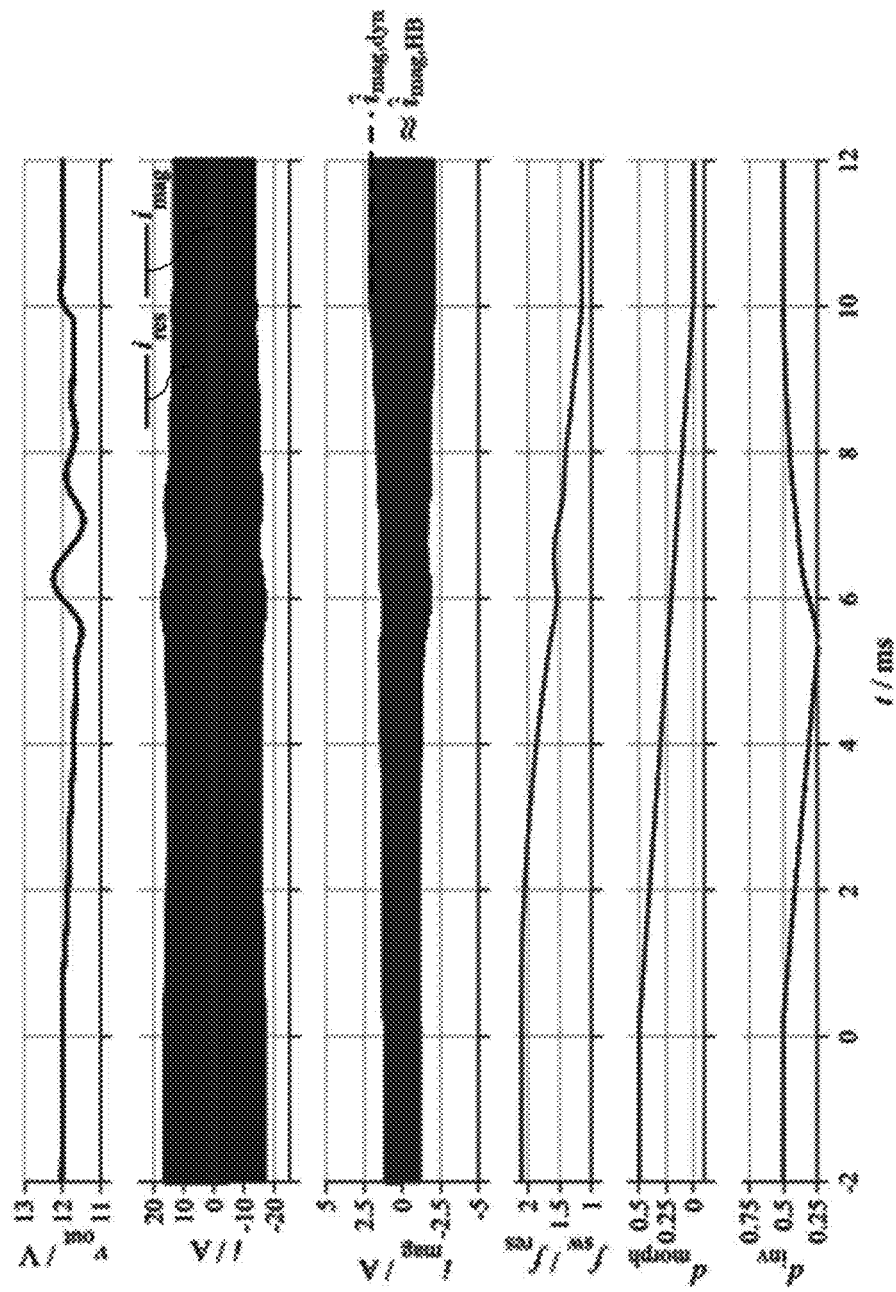
FIG. 13 is an improved morphing transition with a dynamic duty cycle.

FIG. 13 shows the improved morphing transition with a dynamic duty cycle. The duty cycle $d_{inv}$ is dynamically adjusted according to the lookup table as depicted in FIG. 11. The magnetizing current does not increase dynamically and stays below the steady-state maximum. Thus, by adjusting the positive inverter voltage pulse, the dynamic increase of the magnetizing current can be limited to prevent transformer saturation.

Figure 14:
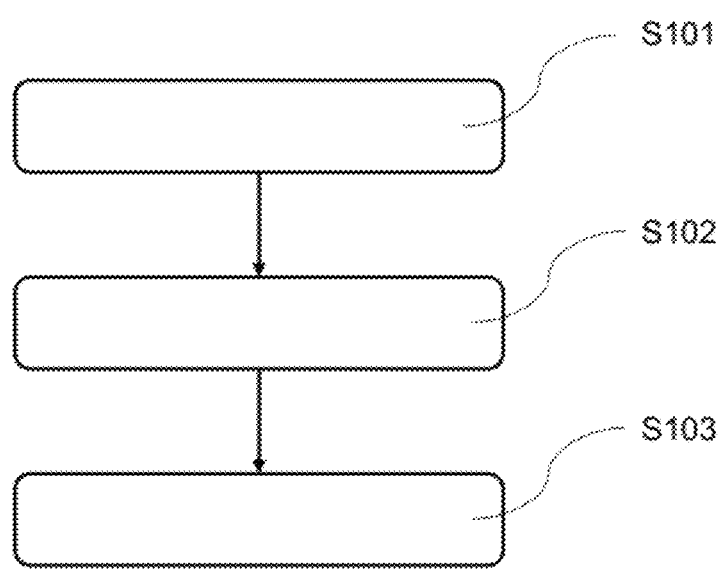
FIG. 14 is a block diagram of a converting method.

FIG. 14 shows a block diagram of a converting method for the full bridge converter-circuit 100. The converting method comprises the step S101 of operating the H-bridge 101 in the first operation mode. In step S102 the H-bridge 101 is operated in a morphing operation mode in which the positive inverter voltage pulse length $d_{pos}*T$ on the first half-bridge 109-1 of the H-bridge 101 is determined on the basis of the negative inverter voltage pulse length $d_{neg}*T$ on the second half-bridge 109-2 of the H-20 bridge 101. In step S103 the H-bridge 101 is operated in a second operation mode.

The positive inverter voltage pulse length $d_{pos}*T$ and/or the negative inverter voltage pulse length $d_{neg}*T$ are adapted such that the duty cycle $d_{pos}$ equals to the duty cycle $d_{inv}$ and the duty cycle $d_{neg}$ equals to the duty cycle $d_m$.

By employing the frequency-multiplier half-bridge modulation (FM-HBM), the junction temperature of the most-stressed inverter switch can be reduced significantly compared to the conventional HBM. The benefit depends on the system configuration and operating point. While for dominant conduction or switching losses, the benefit is remarkable, for nearly identical switching and conduction losses of the complementary switched MOSFETs, the junction temperature is similar. To maximally exploit the primary semiconductors in half-bridge configuration, the FM-HBM is the superior choice compared to the conventional HBM. Especially if conduction losses are the dominant loss contributor and the semiconductors are designed for full-bridge configuration, the FM-HBM offers an easy and effective loss reduction of the most stressed semiconductor.

An on-the-fly morphing transition between FM-HBM and full-bridge operation can be easily achieved using an up-down counter for the modulation. Experimental results prove that the undershoot/overshoot of the transition was limited to only 6%. Finally, EMI implications of the modulation must be considered as additional noise frequencies that result from the reduced switching frequency at odd integers of half the operating frequency. While this operation was able to reduce oscillations of the output significantly, it can result in partial saturation of the transformer core because the magnetizing current increases dynamically during the morphing process.

Through the frequency-multiplier modulation over at least two resonant periods, thermal imbalances are reduced or remain the same as with conventional half-bridge modulation, resulting in lower junction temperatures. If the operating mode, however, is changed suddenly from full-bridge operation to frequency multiplier modulation during the operation, the output voltage may experience significant oscillations that can destroy the converter. Through the presented easy-to-implement on-the-fly topology morphing, it is possible to morph during the operation from full-bridge modulation to frequency-multiplier half-bridge operation and reverse. During the morphing process, it is possible to slowly adjust the frequency to prevent significant output oscillations. By controlling the pulse lengths during the morphing mode operation, saturation of the transformer core is prevented and a constant output power during the morphing is maintained.

In summary, it is to be noted that the disclosure enables to provide a method as well as a circuit for limiting a dynamic increase of the magnetizing current to prevent a transformer saturation.

What is claimed is:

1. A full bridge converter-circuit having an H-bridge and a transformer with a transformer core, comprising:
   a control circuit for operating the H-bridge in a first operation mode or a second operation mode, wherein the first operation mode is a full bridge operation of the H-bridge and the second operation mode is a frequency multiplier half bridge operation of the H-bridge or wherein the first operation mode is a frequency multiplier half bridge operation of the H-bridge and the second operation mode is a full bridge operation of the H-bridge,
   wherein the control circuit is configured that between switching from the first operation mode to the second operation mode a morphing operation mode is applied in which a positive inverter voltage pulse length on a first half-bridge of the H-bridge is determined on the basis of a negative inverter voltage pulse length on a second half-bridge of the H-bridge, a look up table, LUT, for looking up the positive inverter voltage pulse length on the basis of the negative inverter voltage pulse length;

wherein a functional graph representing the dependency of the positive inverter voltage pulse length on the negative inverter voltage pulse length is V-shaped having a minimum.

2. The full bridge converter-circuit according to claim 1, wherein the full bridge converter-circuit is an LLC resonant converter, wherein in the frequency multiplier half bridge operation of the H-bridge, switches are pulsed with a switching frequency that is at least twice a frequency of a resonant current.

3. The full bridge converter-circuit according to claim 1, wherein the positive inverter voltage pulse length is equal to a switching time for switching a switch on the first half-bridge of the H-bridge and/or wherein the negative inverter voltage pulse length is equal to a switching time for switching a switch on the second half-bridge of the H-bridge.

4. The full bridge converter-circuit according to claim 1, wherein the control circuit is configured to increase or decrease the negative inverter voltage pulse length linearly during the morphing operation mode.

5. The full bridge converter-circuit according to claim 1, wherein the positive inverter voltage pulse length is adjusted based on measurements of a magnetic field sensor or the positive inverter voltage pulse length is adjusted based on online calculations.

6. The full bridge converter-circuit according to claim 1, wherein the minimum is between a value of 0.2 and 0.3 of the negative inverter voltage pulse length and/or between a value of 0.2 and 0.3 of the positive inverter voltage pulse length.

7. The full bridge converter-circuit according to claim 1, wherein to a value of 0 of the negative inverter voltage pulse length a value of 0.5 of the positive inverter voltage pulse length is assigned and/or to a value of 0.5 of the negative inverter voltage pulse length a value of 0.5 of the positive inverter voltage pulse length is assigned.

8. A converting method for a full bridge converter-circuit having an H-bridge and a transformer with a transformer core, comprising the steps:

operating the H-bridge in a first operation mode or in a second operation mode, the first operation mode being a full bridge operation of the H-bridge and the second operation mode being a frequency multiplier half bridge operation of the H-bridge, or the first operation mode being a frequency multiplier half bridge operation of the H-bridge and the second operation mode being a full bridge operation of the H-bridge;

operating the H-bridge between switching from the first operation mode to the second operation mode in a morphing operation mode in which a positive inverter voltage pulse length on a first half-bridge of the H-bridge is determined on the basis of a negative inverter voltage pulse length on a second half-bridge of the H-bridge, wherein the positive inverter voltage pulse length is stored in a look up table, LUT, on the basis of the negative inverter voltage pulse length, using a functional graph representing the dependency of the positive inverter voltage pulse length on the negative inverter voltage pulse length, the functional graph being V-shaped having a minimum.

9. The converting method according to claim 8, wherein the negative inverter voltage pulse length is increased or decreased linearly during the morphing operation mode.

10. The converting method according to claim 8, wherein the LUT is stored in a digital memory of a control circuit.

11. The converting method according to claim 8, wherein the LUT is derived from simulations in which a pulse length is adjusted to control a magnetizing current.

12. The converting method according to claim 8, wherein the first operation mode is a full bridge operation of the H-bridge and the second operation mode is a frequency multiplier half bridge operation of the H-bridge where switches are pulsed with a switching frequency that is at least twice a frequency of a resonant current or the first operation mode is a frequency multiplier half bridge operation of the H-bridge and the second operation mode is a full bridge operation of the H-bridge.

13. The converting method according to claim 8, wherein the positive inverter voltage pulse length and/or the negative inverter voltage pulse length are adapted such that a duty cycle of a positive inverter equals to a duty cycle of an inverter and the duty cycle of a negative inverter equals to the duty cycle of a morphing operation.

14. The converting method according to claim 8, wherein the positive inverter voltage pulse length is adjusted based on measurements of a magnetic field sensor or the positive inverter voltage pulse length is adjusted based on online calculations.

15. The converting method according to claim 8, wherein a functional graph representing a dependency of the positive inverter voltage pulse length on the negative inverter voltage pulse length has a minimum.

* * * * *